United States Patent [19]

Röschlein et al.

[11] Patent Number: 4,575,736

[45] Date of Patent: Mar. 11, 1986

[54] PRINT HEAD FOR A DOT MATRIX INK PRINTER

[75] Inventors: Rolf Röschlein; Heinz Schulte, both of Paderborn-Sande, Fed. Rep. of Germany

[73] Assignee: Nixdorf Computer AG, Fed. Rep. of Germany

[21] Appl. No.: 598,517

[22] Filed: Apr. 9, 1984

[30] Foreign Application Priority Data

Apr. 12, 1983 [DE] Fed. Rep. of Germany ....... 3313142

[51] Int. Cl.⁴ .............................................. G01D 15/16

[52] U.S. Cl. .................................................. 346/140 R

[58] Field of Search .................................... 346/140 R

[56] References Cited

U.S. PATENT DOCUMENTS

| | | | |
|---|---|---|---|
| 4,158,847 | 6/1979 | Heinzl | 346/140 |
| 4,429,320 | 1/1984 | Hattori | 346/140 |
| 4,454,518 | 6/1984 | Bangs | 346/140 |

*Primary Examiner*—Joseph W. Hartary
*Attorney, Agent, or Firm*—Krass & Young

[57] ABSTRACT

A print head for an ink printer is provided with an ink reservoir which is arranged near a plane transversely intersecting the print jet opening. Thereby it is possible to bring the print head into various inclined positions without interfering with the ink feed.

7 Claims, 1 Drawing Figure

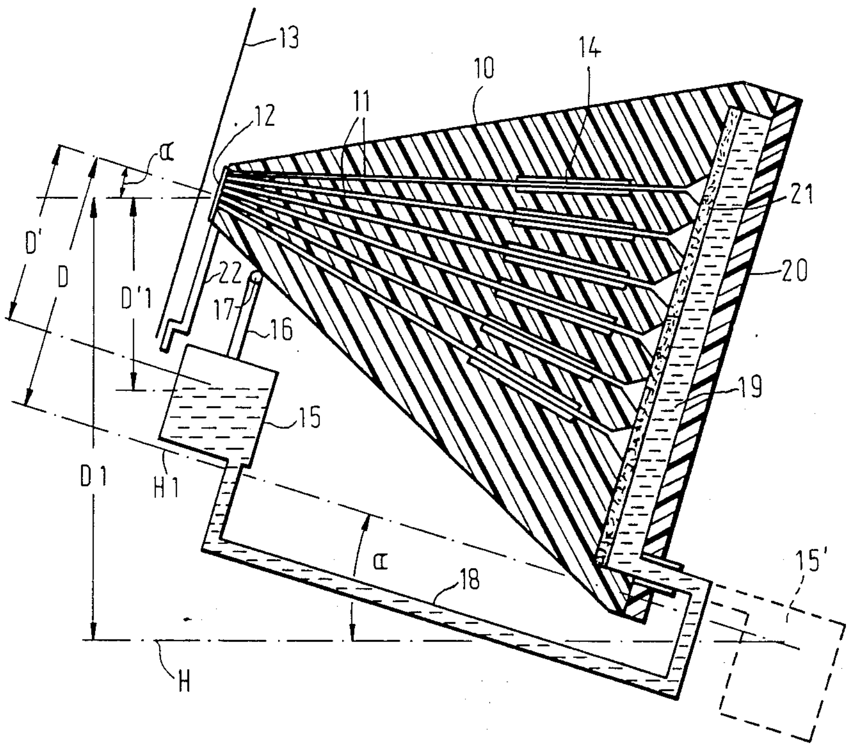
13
10
14
12
11
α
21
20
D'
D
D'1
22
17
16
19
15
H1
D1
α
18
15'
H

PRINT HEAD FOR A DOT MATRIX INK PRINTER

TECHNICAL FIELD

The invention relates to a print head for an ink printer with at least one print jet in the form of an ink duct to which is assigned a drive element causing the detachment of ink droplets at the print jet opening and which is fed with ink from an ink reservoir, by capillary action for example, where the level of the ink reserve present in the ink reservoir is arranged at or below the level of the print jet opening.

BACKGROUND ART

Such a print head is known for example from German Pat. No. 2,704,735 and can for example be constructed so that it contains a plurality of ink ducts which open by their print jet openings at the tip of the print head in a grid-like distribution, by means of which it is possible, with a suitable selective triggering of the respective drive elements, piezoelectric ones for example, with electric voltage pulses in the course of a line-by-line movement of the print head, to record characters on a recording medium such as paper. Here the respective drive element as a result of its triggering with the voltage pulses casues a corresponding pulse-like contraction of the ink ducts, by means of which pressure pulses are exerted on the ink present in the ink ducts, which in turn lead to the detachment of ink droplets at the print jet openings of the ink ducts as well as to their being transferred to the recording medium.

In the known print head an ink reservoir is arranged behind the print head part in such a way that the level of the ink reserve is below the level of the print jet openings. The print jets are supplied with ink from the ink reservoir through capillary action, whereby an ink meniscus is then formed on the respective ink jet openings, which makes possible the later detachment of an ink droplet by the pressure pulse described.

The level of the ink reserve should not be too low below the level of the print jet openings, since then the supplying of the ink ducts and the formation of the ink meniscus on the print jet openings will be impaired, so that it could happen that no further droplet detachment occurs. However, on the other hand the level of the ink should also not be above the level of the print jet openings, since then the ink could run out of the print jet openings.

In consideration of the relationships mentioned above, ink printers are arranged so that their print head prints in a horizontal direction on a recording medium moving in a vertical plane. However there are also application cases of a printer in which the recording medium is arranged not in a vertical plane but in a plane inclined to the vertical, which means that the print head must give off the ink droplets obliquely upward or obliquely downward. For this an arrangement which for example is known from German Pat. No. 2,704,735 must correspondingly be positioned inclined with respect to the vertical, which can cause the level difference between the ink reserve and the print jet openings, which is essentially correct in the horizontal arrangement, to be too great when printing obliquely upwards, so that the printing process is interrupted due to the lack of formation of a meniscus on the print jet openings, or the level of the print jet openings is below the level of the ink reserve in the ink reservoir when printing obliquely downward, so that the ink comes out of the print jet openings continually.

SUMMARY OF THE INVENTION

It is the problem of the invention to avoid these disadvantageous effects of an inclined arrangement of the print head and to supply an apparatus which can be pivoted or inclined within broad limits and makes possible satisfactory recordings in all its positions.

This problem is solved according to the invention for a print head of the type mentioned at the start by having the ink reservoir near a plane transversely intersecting the print jet opening.

This arrangement of an ink reservoir with respect to a print head is not provided in the previously known apparatus of this type, but rather in these the ink reservoir is always located behind the print head at a relatively great distance from the print jet openings. If such an arrangement is pivoted out of the horizontal position with the print jet openings, upward for example, then the difference in level between the print jet openings and the ink reserve in the ink reservoir becomes considerably greater as a result of the great distance between print jet openings and ink reservoir. For this reason, up to now in the known apparatus the position of the ink reservoir behind the print head has had to be prescribed very accurately and within relatively narrow limits if any certain slight pivoting of the print head is to be possible at all. The invention departs entirely from this principle and provides an arrangement of the ink reservoir which for example is immediately adjacent to the print jet opening. When such an arrangement is pivoted as a whole, then the difference in level between the print jet opening and the ink reserve is practically the same even with large pivoting motions, i.e. in pivoting upward it changes only slightly and within such limits that no disruption of the ink droplet formation is to be feared. The downward pivoting of the print head can be carried far enough until the print jet openings come below the level of the ink reserve, which is the case after a considerably greater pivoting range than was possible in previous apparatus of this type.

Different solutions are conceivable for the arrangement of an ink reservoir near the plane of the print jet openings. The ink reservor can be arranged next to the print head or even under it, which depends on the construction of the print head. When the ink duct or ducts are fed by capillary action, the ink reservoir may advantageously be arranged below the print head, since there is more space available here for accommodating the ink reservoir due to the pointed shape of the print head. It is advantageous then to arrange the ink reservoir under the print head immediately behind the plane of a recording support to be written upon.

The ink reservoir may be mechanically connected with the print head, so that it is moved along when the print head is swiveled. In this manner the difference in level between the print jet opening and the ink reserve can be kept practically constant within a broad pivoting range.

The mechanical connection of the ink reservoir with the print head may include a universal joint suspension which will ensure that the ink reservoir is always suspended vertically under the print head in the various oblique positions of the latter. It is true that in a highly oblique position this increases the difference in level with respect to the horizontal between the print jet opening and the ink reserve, but when the print head tip is pivoted downward a state is later reached in which the print jet opening is below the level of the ink reservoir. For this a semi-universal joint suspension is sufficient for the universal joint suspension.

In order for the ink reservoir not to reach the plane of the recording support with such a hinge joint of the ink reservoir with the print head when it pivots the latter downward, it is advantageous to provide a stationary stop element between the plane of the recording support and the ink reservoir.

BRIEF DESCRIPTION OF DRAWING

The single FIGURE illustrates an and embodiment of the invention in sectional plan view.

DETAILED DESCRIPTION OF SPECIFIC EMBODIMENT

In the FIGURE a print head according to the invention is represented diagrammatically in a cross-section as an embodiment example. This print head consists essentially of a plastic part 10 which is conical in shape and in which the ink ducts 11 are inserted, which converge at the left tip of the part 10 and open there with jet openings 12. Spaced apart from the tip of the part 10 is arranged a printing medium 13 on which the ink droplets emerging from the jet openings 12 can record characters due to the mosaic-like distribution of the jet openings 12 with a relative motion between the part 10 and the printing medium 13.

In the embodiment example represented the ink droplets are produced by having tubular piezoelectric drive elements 14 which surround the ink ducts 11 selectively triggered with voltage pulses in rapid succession, whereby they deform in the manner of a contraction and generate a pressure pulse in the respective ink duct 11 which acts on the ink present in the ink duct 11 in such a way that the ink is detached at the jet openings 12 in droplet form and is shot onto the printing medium 13.

For supplying the ink ducts 11 with ink, an ink supply system is provided the ink reservoir 15 of which is arranged under the part 10 immediately behind the plane of the printing medium 13 and suspended from the part 10 by way of a mechanical connection 16 which includes a pivot or hinge joint device 17, preferably a suspension which permits pivotal motion between body 10 and reservoir 15 only in one plane (in the case the plane of the drawing) and is, in that sense, semi-universal.

The ink reservoir 15 is connected by way of a line 18 with an ink chamber 19 which is common to all of the ink ducts 11 and is formed between the part 10 and a rear plate 20 joined to it in a sealing manner. The ink chamber 19 may for example have a width of 0.1 to 0.3 mm so that it is filled with ink by capillary action. The left side of the ink chamber 19 is connected with the ink ducts 11 by way of a filter arrangement 21, which in the practical design may have a thickness of 0.05 to 0.3 mm and a mesh opening of 0.035 mm and consist for example of a fibrous plastic material.

The total arrangement shown in the FIGURE is inclined to the horizontal H by an angle $\alpha$ so that the print direction of the print head correspondingly runs obliquely upward to the inclined printing medium 13. The dot-dash line showing the horizonal H, due to the inclination, reaches a position corresponding to the dot-dash line H1.

In the following it will now be considered in what way the difference in level between the print jet openings 12 and the ink reserve would change if the ink reserve were arranged in a reservoir 15' which in the figure is represented in broken lines in an arrangement corresponding to the prior art, such that it is behind the part 10. With a horizontal arrangement the line H1 would coincide with the line H and the difference in level D would exist between the ink reserve in the ink reservoir 15' and the print jet openings 12. If the whole arrangement were tilted by the angle $\alpha$, this difference in level would increase to the value D1, where in some cases the limiting valve would be slightly exceeded at which the meniscus formation on the print jet openings 12 fails to occur.

However if the ink reservoir is arranged as shown in the FIGURE for the ink reservoir 15, then the difference in levels D' is found in the horizontal arrangement in which the lines H and H1 coincide, whereas the difference in levels D'1 is found in the tilted arrangement. It is easily seen that these two differences in level practically agree and that a relatively small difference occurs here only when the total arrangement is tilted backwards still further as compared with the position shown in the FIGURE.

It is easily seen, then, that the arrangement shown in the FIGURE can also be tilted forward, so that the printing medium 13 then lies in a plane which runs obliquely from the upper left to the lower right. This tilting action can be carried far enough until the level of the print jet openings 12 is below the level of the ink reserve in the ink reservoir 15, since then the ink continuously comes out of the print jet openings 12. This state however is reached only with a very highly oblique position of the part 10, particularly when the mechanical connection 16 between the ink reservoir 15 and the part 10 contains a hinge joint arrangement. In this case the ink reservoir 15 is always suspended vertically under the part 10, and when the part 10 is tipped forward the critical state in which the level of the print jet openings 12 is below the level of the ink reserve is correspondingly reached later. In order that the ink reservoir 15 may not thereby come into the plane of the printing medium 13 and impair the movement of the latter, a stationary stop element 22 is provided which in the embodiment example represented is joined fixedly with the part 10. If the part 10 is tilted downward by its left tip, then the ink reservoir 15 in a certain oblique position will strike against the stop element 22 and thereby be kept off of the printing medium 13.

It is evident from the foregoing description that the principle represented in the figures does not depend in its operation on the pivot point chosen as an illustrative example, which here is located in the ink reservoir 15' denoted in broken lines. On the contrary it is also possible to pivot the whole arrangement around an axis which is located in the ink reservoir 15 or else in the tip of the part 10 or in the region between these two points.

The ink reservoir 15 may also be only an intermediate reservoir which is fed for example by a flexible line from a larger reservoir which is accommodated in stationary form. In this case in particular the ink reservoir 15 may also be integrated into the part 10.

Finally, the ink reservoir 15 itself can also be arranged in stationary form and be connected by way of a flexible line 18 with the print head. In this case too the assignment principle diagrammatically shown in the FIGURE is fulfilled. For this it is advantageous to arrange the ink reservoir in such a way that it always maintains a prescribed position regardless of the different inclined positions, for example those of a printing mechanism containing the print head. It is suitable for the corresponding position to be located then at the end of one line of the print mechanism.

We claim:

1. Printing apparatus of the type which includes a body forming an ink duct having an input end and outlet end, an ink driver associated with said duct and selectively actuable to cause ink to be emitted from said outlet end, wherein the improvement comprises:

an ink reservoir;

pivot means connecting said reservoir to said body proximate the outlet of said duct and operative to maintain the inclination of the reservoir regardless of variations, at least within a certain range, in the inclination of said body; and means connecting said reservoir to said input end of said duct.

2. Apparatus as defined in claim 1 wherein said reservoir is suspended from said body by means of said pivot means.

3. Apparatus as defined in claim 1 wherein said ink drive is piezoelectrically operated.

4. Apparatus as defined in claim 1 wherein said body forms a plurality of substantially parallel ink ducts each having an input end and and outlet end, all of the outlet ends lying in a common plane.

5. Apparatus as defined in claim 4 wherein said body defines a common supply chamber connected to all of said inlet ends and said means connecting said reservoir is connected to said input ends through said supply chamber.

6. Apparatus as defined in claim 5 wherein piezoelectric driver means are associated with each of said ducts.

7. Apparatus as defined in claim 1 further including mechanical stop means disposed on said body for limiting the relative variation in inclination between said body and said reservoir means in one direction of pivotal rotation.

* * * * *